Jan. 19, 1960   G. K. STEEL   2,922,053
CONTROL SYSTEMS
Filed July 21, 1958   3 Sheets-Sheet 1

INVENTOR
GERALD KIRTON STEEL
BY
ATTORNEYS

Jan. 19, 1960

G. K. STEEL 2,922,053

CONTROL SYSTEMS

Filed July 21, 1958

3 Sheets-Sheet 2

INVENTOR
GERALD KIRTON STEEL
BY
Haure and Nydick
ATTORNEYS

Jan. 19, 1960

G. K. STEEL 2,922,053

CONTROL SYSTEMS

Filed July 21, 1958

3 Sheets-Sheet 3

INVENTOR
GERALD KIRTON STEEL

BY Hane and Nydick

ATTORNEYS

United States Patent Office 2,922,053
Patented Jan. 19, 1960

2,922,053
CONTROL SYSTEMS

Gerald Kirton Steel, Potters Bar, England, assignor to The British Iron & Steel Research Association, London, England Application July 21, 1958, Serial No. 749,940

Claims priority, application Great Britain September 10, 1957

11 Claims. (Cl. 307—149)

This invention relates to control systems particularly for adjusting the value of a controllable variable quantity, such as the position of a movable member, sequentially to two or more prescribed values. An example of the application of such a control system is a forging press, where the forging press must be reciprocated between an accurately defined lower position which determines the thickness of the forging, and an upper position separated from the lower position by a stroke sufficient to permit the element to be forged to enter and to be manipulated between the press members.

An object of this invention is to provide a control system which will automatically drive a variable sequentially and cyclically to a plurality of datum values.

Another object is to cause the change of the variable to the next datum value to be automatically initiated by the attainment of a first datum value by the variable.

Another object is to provide a forging press in which the press member is driven automatically and cyclically between two accurately defined preset positions.

Figure 1:
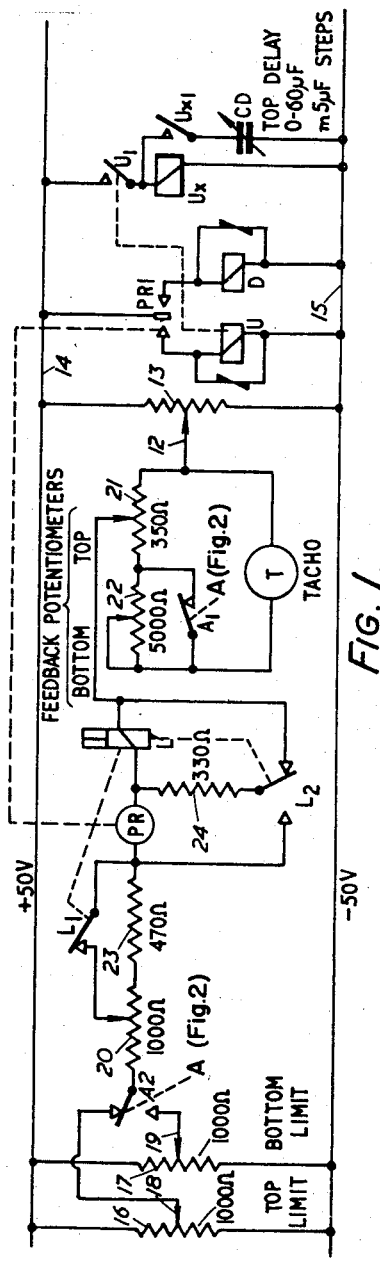
Figure 2:
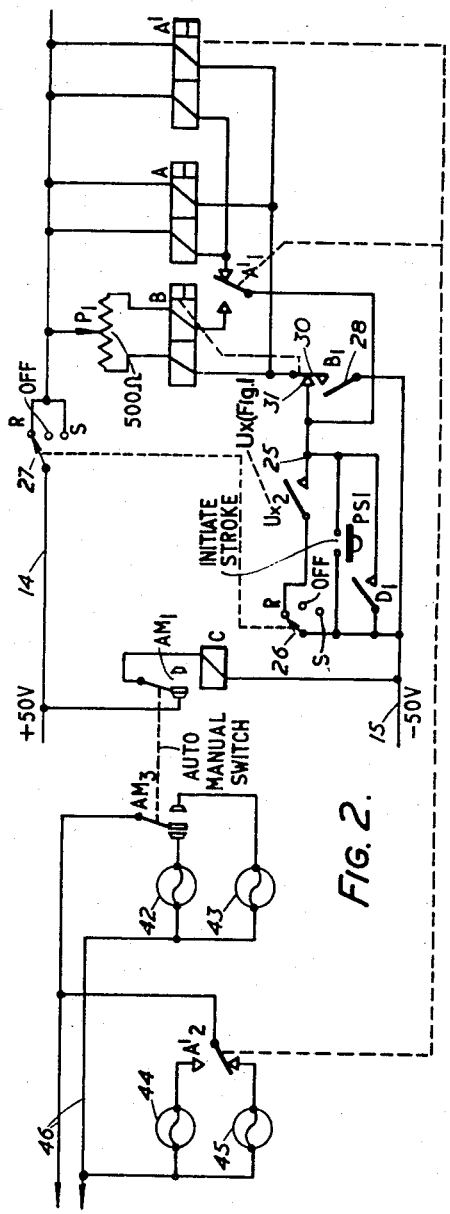
Figure 3:
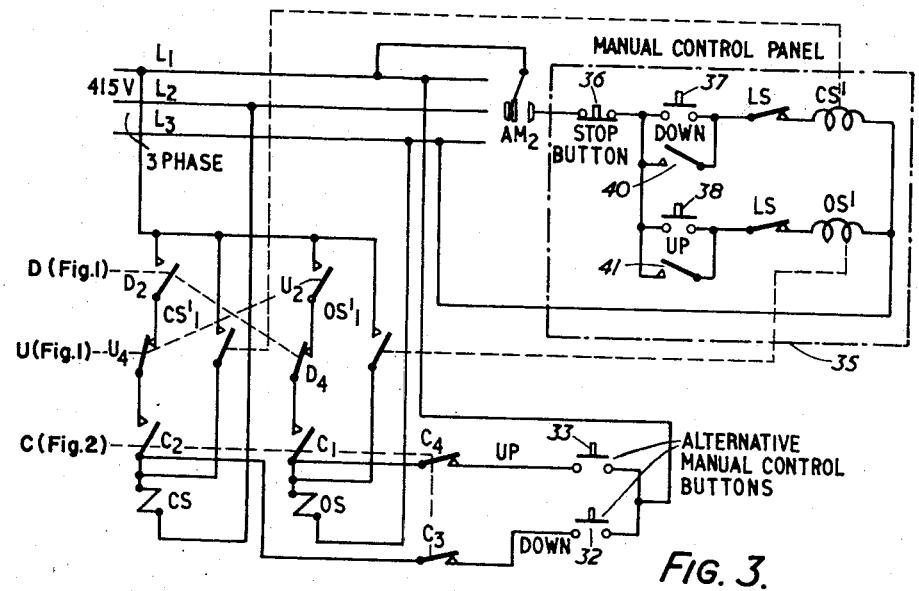
Figure 4:
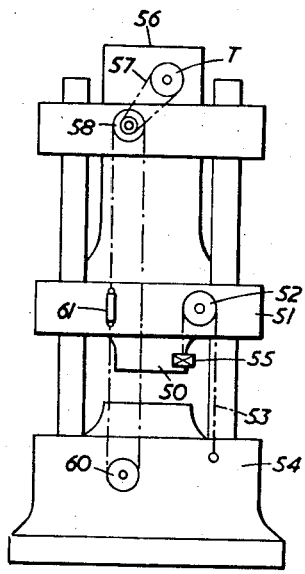
Figure 5:
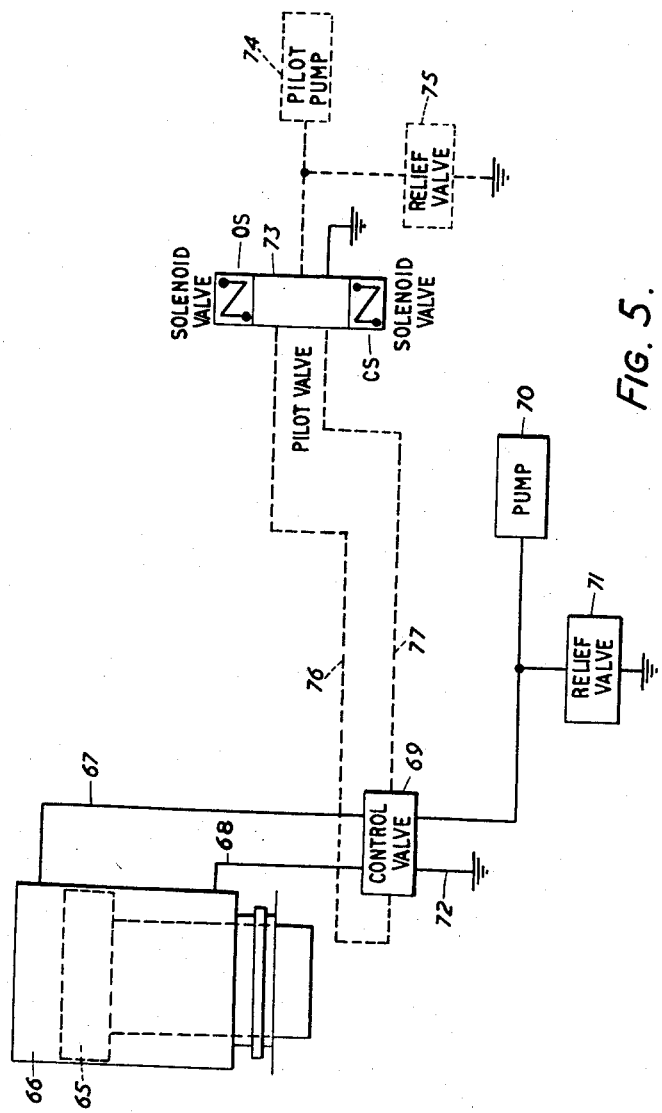

Other objects and advantages of the invention will become more apparent from the following description of an embodiment of the invention, applied to the control of a forging press, with reference to the accompanying drawings, in which Figures 1, 2 and 3 are circuit diagrams of one form of control system, Figure 4 schematically illustrates a forging press, and Figure 5 schematically shows a hydraulic control system for a forging press.

Referring to Figure 1, the element to be controlled is coupled to the slider 12 on a potentiometer 13 which is connected across the supply lines 14, 15. The voltage of the slider 12 is then proportional to the position of that element. The upper and lower limits of movement of the element are set by the potentiometers 16, 17 respectively, the sliders 18, 19 of which are adjusted to the respective desired values; as shown potentiometers 16, 17 are also connected across supply lines 14, 15.

Sliders 18, 19 are connected to opposite poles of a switch $A_2$ formed by the contacts of a relay A. The moving contact of contacts $A_2$ is connected to a polarised relay PR through a voltage divider 20 and contacts $L_1$. By these means the voltage of slider 18, or of slider 19, is applied to relay PR and this voltage is opposed by the voltage of potentiometer 13, the slider 12 of which is connected through a voltage divider 21 to the relay PR.

A tacho-generator T is also coupled to the element to be controlled and produces a voltage proportional to the speed of movement of the element. This voltage is applied, either through contacts $A_1$ of relay A or, when contacts $A_1$ are open, through potentiometers 22, to voltage divider 21 so as to back off the position-representing voltage from potentiometer 13.

The sensitive relay PR is protected from overloads by a relay L which is connected in series with relay PR. Relay L has the beforementioned contacts $L_1$ which normally short circuit a resistor 23 and contacts $L_2$ which connect a resistor 24 across either relay L or relay PR.

When the current flow becomes excessive relay L is energised and contacts $L_1$, and $L_2$ are moved from the positions shown in order to introduce series resistance and in order to shunt relay PR.

Polarised relay PR has contacts forming a centre stable two-pole switch PR1 which, in one position, causes energisation of an "Up" relay U controlling movement upwards of the element and, in the other position, causes energisation of a "Down" relay D which controls downward movement. Relay U has contacts $U_1$ connected in series with a relay $U_x$ across supply lines 14, 15; a variable condenser $C_D$ is connected in parallel with relay $U_x$ to supply an adjustable delay between the opening of contacts $U_1$ and the deenergising of relay $U_x$.

Relays D, $U_x$ have contacts $D_1$, $U_{x2}$ connected in parallel between supply line 15 and a terminal 25 (Figure 2). Contacts $U_{x2}$ are connected in series with a manually operated three position switch 26 while a button PS1 is connected in parallel with contacts $D_1$. Supply line 14 is connected through a manually operated three position switch 27 ganged with switch 26 to each of the windings of each of three relays A, $A^1$, B. Each of these relays has two windings and is operated only when current flows through one only of the windings. Relays A, $A^1$ are connected in parallel and operate together, one winding of each being connected to one pole of a switch $A_1{}^1$ of relay $A^1$. One winding of relay B is connected to the other stationary contact of contacts $A_1{}^1$, while the moving contact is connected to terminal 25. The remaining windings of relay A, $A^1$, B are commoned and connected to a contact assembly $B_1$ of relay B. This assembly has a moving contact 28 connected direct to supply line 15 and a manually operated spring contact 30 normally engaging a fixed contact 31. When relay B is energised contact 28 engages contact 30 and in so doing disengages contact 30 from contact 31.

The movement of the device to be controlled is regulated by two servomotors, the windings of which are shown at CS and OS of Figure 3, winding CS controlling downward motion and OS upward motion. Winding CS is connected in series with contacts $C_2$ of relay C, normally closed contacts $U_4$ of relay U, and normally open contacts $D_2$ of relay D across one of the phases of a 3-phase supply $L_1$, $L_2$, $L_3$. Similarly, winding OS is connected in series with contacts $C_1$ of relay C, normally closed contacts $D_4$ of relay D and normally open contacts $U_2$ of relay U across another phase of the supply. Winding CS and OS are alternatively energisable by hand through contacts $C_3$ and down button 32, and through contacts $C_4$ and up button 33, respectively.

For the automatic control of the element, manually operated ganged switches $AM_1$, $AM_2$, $AM_3$ are placed in the left hand positions shown. This has the effect of energising relay C and consequently of closing contacts $C_1$, $C_2$ and opening contacts $C_3$, $C_4$. When the switches are in their manual positions, relay C is deenergised and contacts $C_3$, $C_4$ close to enable the servomotors to be controlled by buttons 32, 33.

During automatic control, the apparatus performs a cycle of operations in which the position-representing voltage from potentiometer 13 is compared with the bottom-limit signal from potentiometer 17, relay D is energised to cause downward motion of the element until the signal applied to relay PR becomes zero, relay A changes over so that the voltage from potentiometer 13 is compared with that from potentiometer 18, relays U and $U_x$ are energised to cause upward motion of the element until the signal applied to relay PR becomes zero again, and after a delay determined by condenser $C_D$, relay A operates to start the next cycle.

Considering the operation of the apparatus in detail, at rest the element is in the position determined by the top limit potentiometer 17, relay PR is deenergised and therefore relays U, $U_x$, D are deenergised. For automatic repetitive motion of the element, switches $AM_1$, $AM_2$, $AM_3$ are put in their left hand positions, switches 26, 27 are placed in their "R" settings and button PS1 is pressed to initiate operation.

Pressing of manually operable button PS1 has the effect of causing relay B to operate since its left hand winding is energised. On operation of contacts $B_1$, relay B remains energised and relays A, $A_1$ remain deenergised until button PS1 is released when the voltage on the moving contact of switch $A_1^1$ is removed and relays A, $A^1$ are operated. Switch $A_2$ is changed over to connect the bottom limit potentiometer 17 to relay PR. Relay PR is operated to cause its contact PR1 to energise relay D, which in turn energises winding CS through contacts $D_2$ and the element is driven downward.

When relay D is energised contacts $D_1$ (Figure 2) close and the voltage of line 15 is applied to contacts $A_1^1$. When this occurs, both windings of relay B are energised and relay B becomes non-operated. When however contacts $B_1$ reopen, the energisation of relays A, $A^1$, B is unaltered.

As the element is driven downwards, the resultant signal applied to relay PR decreases progressively and becomes zero shortly before the element reaches the desired low limit, owing to the velocity-representing signal from tacho-generator T. When this occurs, relays PR and D and winding CS are deenergised and the element comes to rest through its momentum at the lower limit.

When relay D is deenergised at the bottom of the travel of the element, contacts $D_1$ open; relays A, $A^1$, the right hand windings of which were formerly energised through contacts 30, 31 and contacts $D_1$, become non-operated, and contacts $A_1^1$ are restored to the position shown in Figure 2, relay B remaining deenergised. Deenergising of relay A changes over contacts $A_2$ which then connects upper limit potentiometer 16 to relay PR. Relay PR is operated to cause relay U to be energised. This in turn results in winding OS being energised by the closing of contacts $U_2$ and in relay $U_x$ being energised by the closing of contacts $U_1$. The element is driven upwards again.

Energising relay $U_x$ causes contacts $U_{x2}$ to close and to apply the voltage of line 15 to both the windings of relays A, $A^1$ which remain non-operated. At the same time relay B is operated by the energisation of its left hand winding. Contacts $B_1$ change over but, in so doing, the relays A, $A^1$, B are unaltered and, in particular, contacts $A_2$ remain as shown in Figure 1.

As determined by the signal supplied by the tacho-generator T, the signal applied to relay PR becomes zero shortly before the element reaches the top limit, and relays PR, U and winding OS are deenergised, the element reaching its upper limit under its momentum. Contacts $U_1$ open but relay $U_x$ is held energised by the discharge of condenser $C_D$ for a period dependent on the setting of the condenser. When relay $U_x$ finally is deenergised, contacts $U_{x2}$ (Figure 2) open; the energisation of the left hand windings of relays A, $A^1$ is broken but the right hand windings remain energised through contacts 28, 30 so that relays A, $A^1$ become operated and contacts $A_2$ (Figure 1) change over to start a new cycle. The element will therefore continue to reciprocate between the upper and lower limits, a delay being provided between the completion of the upward movement and the initiation of the successive downward movement. If no such delay is required, the relay $U_x$ may be removed, contacts $U_{x2}$ being replaced by contacts of relay U.

If it is desired that the element shall be caused to make a single reciprocation only for each operation of button PS1, switches 26, 27 are moved to the "S" setting. In this case the downward movement of the element is the same as described above. When relay D is deenergised near the bottom of the travel, relays A, $A^1$, B become deenergised, contacts $A_2$ change to the position shown in Figure 1 and the element is driven upwards. Upward movement ceases as before at the upper limit by deenergisation of relay U. Relays A, $A^1$, B remain deenergised and the element remains at the upper limit until button PS1 is pressed again.

Manual control by the buttons 32, 33 when switches $AM_1$, $AM_2$ and $AM_3$ are in their right hand positions and relay C is deenergised is believed to be immediately obvious from Figure 3. This figure also shows a control panel 35 which can be used for manual control in place of buttons 32, 33. Switch $AM_2$ is connected to line $L_1$ and through the normally closed contacts 36 of a manually operable stop button to the contacts 37, 38 of a manually operable up button and a down button respectively. These contacts 37, 38 are connected in parallel to contacts 36 and are also connected separately to the winding of intermediate relays $CS^1$, $OS^1$ and then to line $L_3$. Contacts 40, 41 are connected across contacts 37, 38 and are closed on appropriate operation of the intermediate relays. Relays $CS^1$, $OS^1$ have contacts $CS_1^1$, $OS_1^1$, in series with the windings CS, OS the servo-motors, so that buttons 37, 38 control the servo-motors.

Indication of operation of the apparatus is given by the indicator lamps shown in Figure 2. Lamps 42, 43 indicate automatic and manual operation respectively and are connected to opposite poles of switch $AM_3$. Lamps 44, 45 indicate that the element is approaching or is at the bottom limit and top limit respectively and is connected to the fixed contacts of contacts $A_2^1$ of relay $A_2$. All the lamps are energised from low voltage, A.C. supply lines 46.

It will be immediately apparent that the control system described may be employed for the control of any variable, the value of which can be adjusted as desired. The slider of potentiometer 13 is positioned by the value of the variable and the servo-motor controlled by windings CS, OS drives the variable in each of two opposite directions. The servo-motor takes any form which is convenient to the variable being controlled and may be an electric-motor operated by contactors, a hydraulic motor or the like.

The control system illustrated in the drawing is primarily intended for controlling the press-member of a forging press, potentiometers 16 and 17 then determining the upper and lower limits of the press-member. The windings CS, OS are the windings of valves controlling the flow of liquid under pressure to the press to cause the press-member to fall and rise respectively and the slider 12 and the tacho-generator T are coupled to the press-member so that the voltage derived therefrom are dependent on the position and velocity of the press-member. Such a press and a hydraulic control system therefor is illustrated in Figures 4 and 5. In Figure 4 the moving press member 50 is carried on a cross head 51 which also carries the position potentiometer 12, 13 which is of rotary type. The slider 12 is connected to a sprocket 52 over which a chain 53 passes. Chain 53 is secured at one end to the base 54 of the press and carries at the other end a weight 55, so that the angular position of the sprocket 52 is determined by the position of the cross head 51 relative to the base 54.

The tacho-generator T is carried on the fixed head 56 of the press and is driven through chain 57 from a sprocket 58. Sprocket 58 is in turn driven by chain 59 which passes round a sprocket 60 on the base 54 and which is attached at 61 to the moving cross head 51. When the cross head 51 moves the tacho-generator T is driven at a speed proportional to the speed of the cross head.

Figure 5 illustrates the hydraulic control system of the press. A piston 65 works in a cylinder 66 and is coupled to the press member 50 and cross head 51. Liquid under pressure can be supplied to the piston above or below the piston through lines 67, 68 respectively. The supply of liquid to lines 67, 68 is controlled by a control valve 69 which is also connected to a pump 70 provided with a pressure relief valve 71 and to a discharge passage 72.

Valve 69 is of known type and is itself controlled hydraulically by a solenoid valve 73 having the windings OS, CS. Valve 73 is supplied by liquid under pressure through pilot pump 57 which has the usual pressure relief valve 75 to maintain a constant pressure.

Energisation of winding OS causes liquid under pressure to pass through a pipe 76 and to operate valve 69 so that liquid from pump 70 is supplied below the piston 65 through pipe 68; at the same time pipe 67 is connected to the discharge passage 72 and the press opens. Similarly, energisation of winding CS operates valve 69 through a pipe 77 to apply liquid from pump 70 to pipe 67 and to connect pipe 68 to the discharge passage 72; this has the effect of causing the piston 65 to descend and to close the press.

It will be observed that the arrangement of contacts $A_1$ and voltage divider 22 are such that a larger velocity feedback signal is applied to the polarised relay PR while the element is moving upwards than when it is moving downwards. This is because the final downward movement of the press-member of a forging press is resisted by deformation of the metal being forged so that the press-member is less likely to over-run at the bottom limit than at the top limit.

The delay provided by the condenser $C_D$ between successive reciprocations of the press-member is to enable the ingot being forged to be manipulated. This manipulation may be controlled either by hand or automatically; in the latter case, the control of the manipulators may be linked to the control of the press so that manipulation occurs between the time the forging tool leaves the surface of the ingot and the time the tool starts the next penetration of the ingot.

When other elements are required to be controlled, it may be desirable for the element to be brought successively to each of three or more successive positions or values. It will be immediately obvious how the system described may be effected to bring this about.

I claim:

1. A control system for bringing a variable successively to each of two datum values, said system comprising a first circuit for generating an electrical signal in accordance with the value of the variable, two further circuits for generating datum electrical signals in accordance with the respective datum values, switching means operatively connectable alternatively to either of said two further circuits, comparing means to which said first circuit and said switching means are connected for comparing said electrical signal with a datum electrical signal, adjusting means for adjusting the value of the variable, and control means controlling said adjusting means and operated by said comparing means for bringing said variable into equality with a datum value and for automatically changing over said switching means when equality is reached.

2. A control system for bringing a variable successively to each of two datum values, said system comprising a first circuit for generating an electrical signal in accordance with the value of the variable, two further circuits for generating datum electrical signals in accordance with the respective datum values, switching means operatively connectable alternatively to either of said two further circuits, comparing means to which said first circuit and said switching means are connected for comparing said electrical signal with a datum electrical signal, to produce an error signal in accordance with the difference between the variable and the corresponding datum value, adjusting means for adjusting the value of the variable, and control means controlling said adjusting means and operated by said comparing means for bringing said error signal to zero and subsequently changing over said switching means.

3. A control system for bringing a variable successively to each of two datum values, said system comprising a first circuit for generating an electrical signal in accordance with the value of the variable, two further circuits for generating datum electrical signals in accordance with the respective datum values, switching means operatively connectable alternatively to either of said two further circuits, comparing means to which said first circuit and said switching means are connected for comparing said electrical signal with a datum electrical signal, said comparing means being operated when the algebraic sum of the signals applied thereto is not zero, adjusting means for adjusting the value of the variable, and control means operated by said comparing means for controlling said adjusting means to bring said algebraic sum to zero and subsequently changing over said switching means.

4. A control system for moving an object alternately to two datum positions, said system comprising a first circuit for generating an electrical signal in accordance with the position of said object, two further circuits for generating datum electrical signals in accordance with the respective datum positions, switching means operatively connectable to either of said two further circuits, comparing means to which said circuit and said switching means are connected for comparing said electrical signal with a datum electrical signal, said comparing means being operated when the algebraic sum of the signals applied thereto is not zero, adjusting means for adjusting the position of the object, and control means operated by said comparing means for controlling said adjusting means to bring said algebraic sum to zero and subsequently changing over said switching means.

5. A control system according to claim 4 in which said object is a reciprocating press member of a forging press and said two datum positions are the upper and lower limits desired for the press member.

6. A control system according to claim 5 in which said first circuit includes a potentiometer controlled by the position of said press member and said further circuits include potentiometers settable according to said limits between which said press member is to reciprocate.

7. A control system according to claim 4 in which said comparing means is a relay to which the difference of said position signal and the selected datum signal is applied, said relay including a switch with two stationary contact members which are alternatively engaged according to the sense of the current through the relay and neither of which are engaged for negligible current through the relay.

8. A control system according to claim 7 in which said control means comprises further relays each connected to one of said stationary contact members, said switching means being changed over each time the further relays are simultaneously deenergized.

9. A control system according to claim 8 in which said further relays control adjusting means for driving the forging member in opposite directions.

10. A control system according to claim 9 including delay means associated with one of the further relays, whereby there is a delay between a datum position being attained and the start of the movement towards the other datum position.

11. A control system according to claim 4 comprising also manually operated means for controlling said control means so that in one condition of said manually operated means said datum signals are applied cyclically and continuously to the comparing device and in another condition of said manually operated means said datum signals are applied to the comparing means once only.

References Cited in the file of this patent

UNITED STATES PATENTS

| | | |
|---|---|---|
| 2,644,642 | Smoot | July 7, 1943 |
| 2,825,825 | Smoot | Mar. 8, 1958 |